(12) United States Patent
Chang et al.

(10) Patent No.: US 12,155,072 B2
(45) Date of Patent: *Nov. 26, 2024

(54) PRECURSOR PARTICLE FOR PREPARATION OF CATHODE ACTIVE MATERIAL FOR SECONDARY BATTERY AND NOVEL PRECURSOR POWDER CONTAINING SAME

(71) Applicant: L&F CO., LTD., Daegu (KR)

(72) Inventors: Sung Kyun Chang, Daegu (KR); Sang Hoon Jeon, Daegu (KR); Sunhong Park, Daejeon (KR); Doe Hyoung Kim, Daegu (KR)

(73) Assignee: L&F CO., LTD., Daegu (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/384,434

(22) Filed: Oct. 27, 2023

(65) Prior Publication Data
US 2024/0063386 A1    Feb. 22, 2024

Related U.S. Application Data

(63) Continuation of application No. 17/606,819, filed as application No. PCT/KR2019/012434 on Sep. 25, 2019, now Pat. No. 12,002,956.

(30) Foreign Application Priority Data

Apr. 30, 2019    (KR) .................. 10-2019-0050190

(51) Int. Cl.
 *H01M 4/525*    (2010.01)
 *C01G 53/00*    (2006.01)
 *H01M 4/505*    (2010.01)
 *H01M 10/0525*    (2010.01)
 *H01M 4/02*    (2006.01)

(52) U.S. Cl.
CPC ............ *H01M 4/525* (2013.01); *C01G 53/50* (2013.01); *H01M 4/505* (2013.01); *H01M 10/0525* (2013.01); *C01P 2002/50* (2013.01); *C01P 2002/85* (2013.01); *C01P 2004/03* (2013.01); *C01P 2004/32* (2013.01); *C01P 2004/84* (2013.01); *C01P 2006/40* (2013.01); *H01M 2004/028* (2013.01)

(58) Field of Classification Search
None
See application file for complete search history.

(56) References Cited

U.S. PATENT DOCUMENTS

2018/0331358 A1* 11/2018 Yamaji .................. H01M 4/505

FOREIGN PATENT DOCUMENTS

CN          106784798 A    *    5/2017

* cited by examiner

*Primary Examiner* — Tanisha Diggs
(74) *Attorney, Agent, or Firm* — LEX IP MEISTER, PLLC

(57) ABSTRACT

Disclosed are novel precursor particles for preparing a cathode active material including transition metal precursor particles containing one or more transition metals, and one or more of an alkali metal and an alkaline earth metal, wherein the alkali metal and the alkaline earth metal are contained in one or more of inner and outer parts of the transition metal precursor particles, and a novel precursor powder including the novel precursor particles.

15 Claims, 6 Drawing Sheets

[FIG. 1]
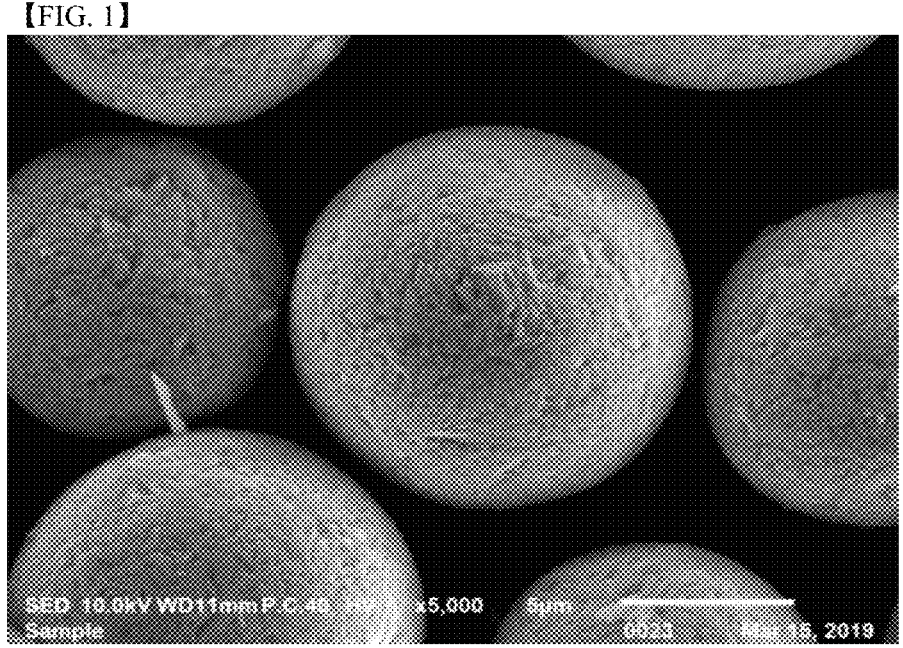

[FIG. 2]
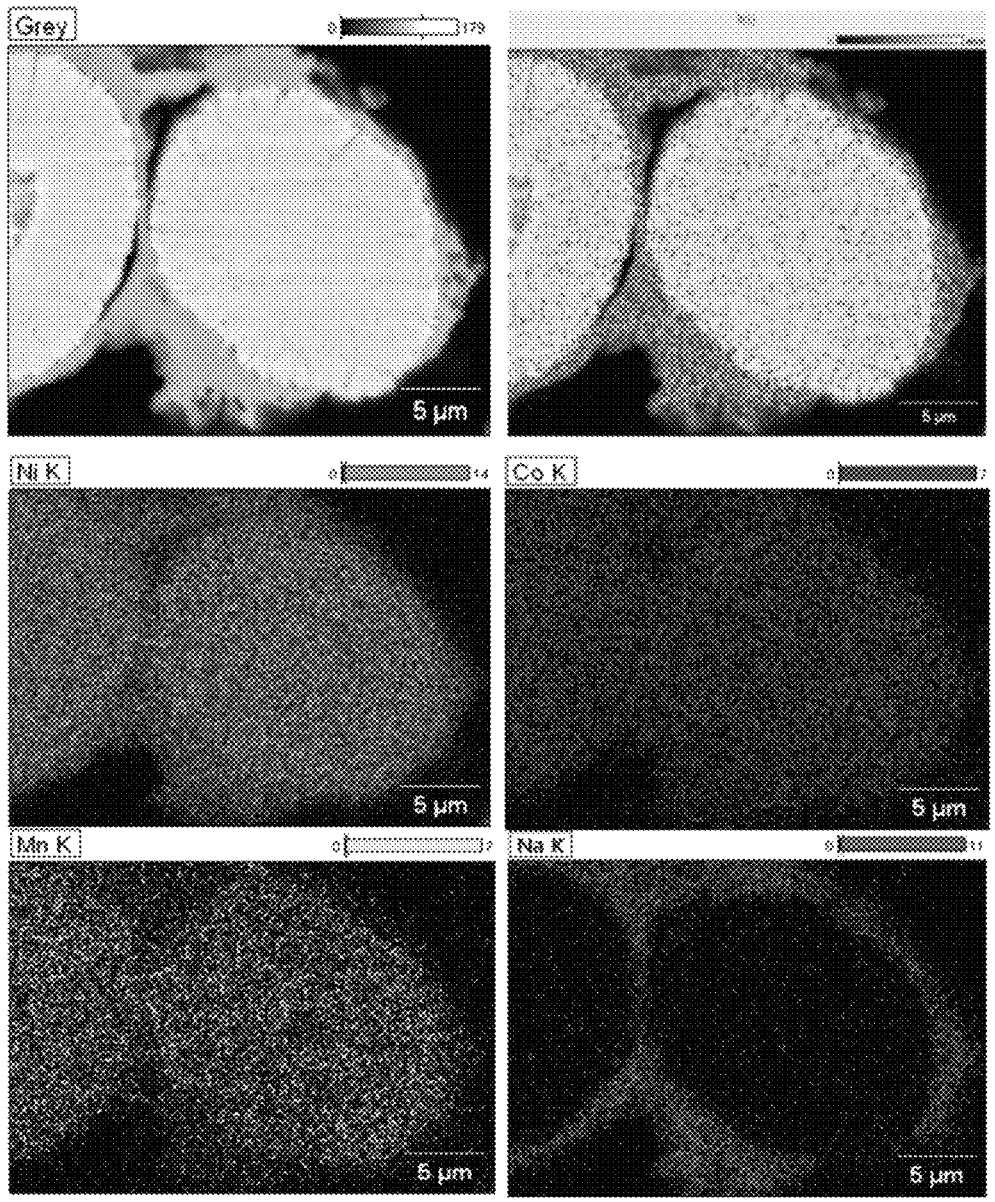

[FIG. 3]
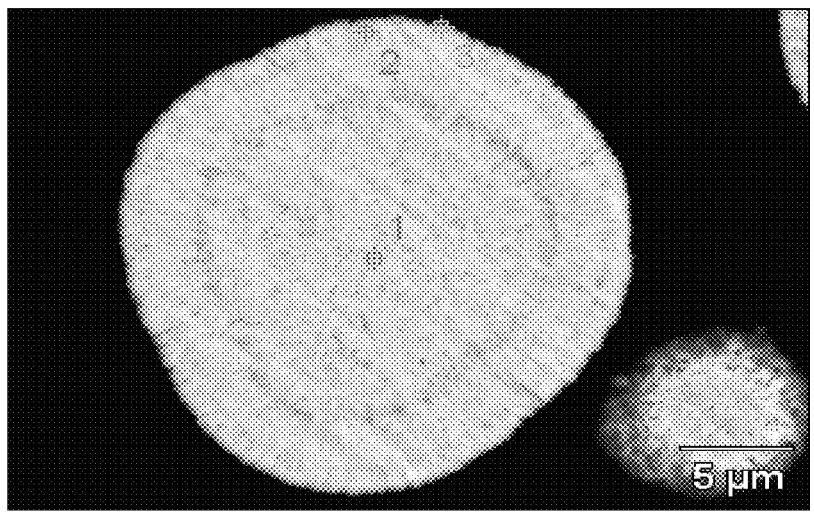
[FIG. 4]
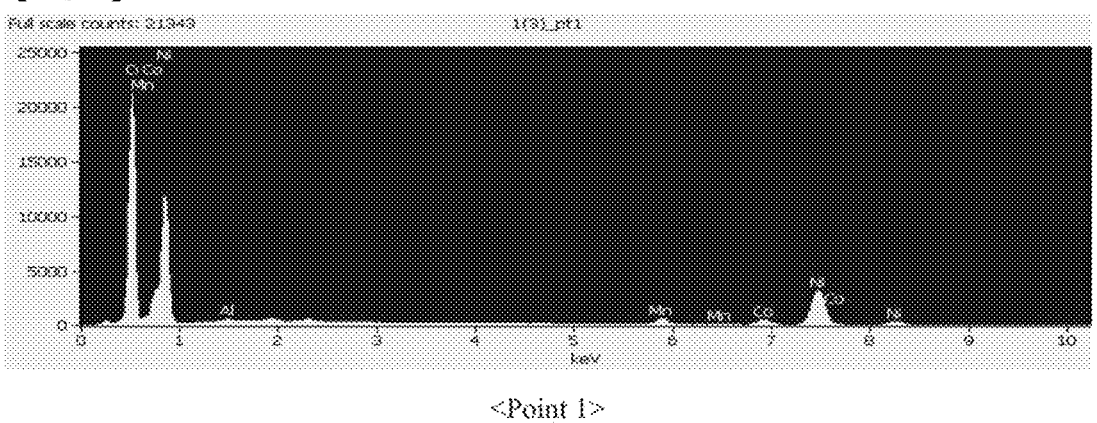
<Point 1>
[FIG. 5]
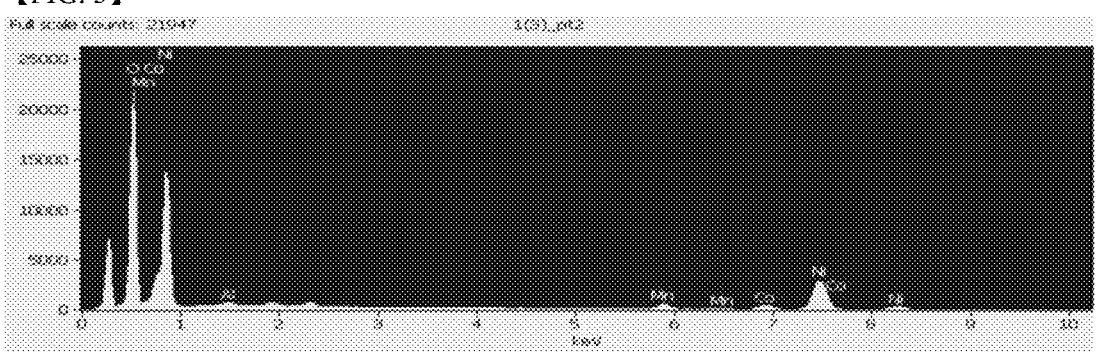
<Point 2>

[FIG. 6]
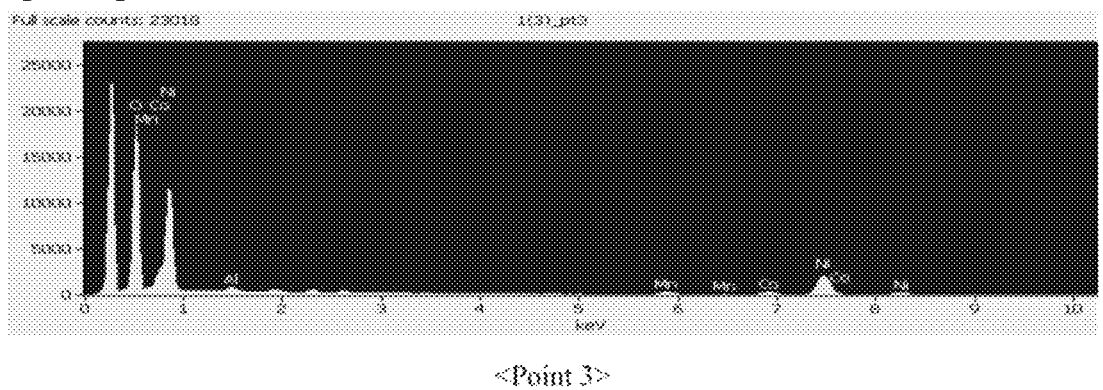
<Point 3>
[FIG. 7]
|  | O-K | Al-K | Mn-K | Co-L | Ni-L |
|---|---|---|---|---|---|
| Point 1 | 32.19 | 0.28 | 4.27 | 10.11 | 53.15 |
| Point 2 | 28.47 | 0.54 | 3.4 | 12.84 | 54.75 |
| Point 3 | 25.36 | 0.8 | 2.81 | 15.45 | 55.57 |
<Point 1~3 Wt%>
[FIG. 8]
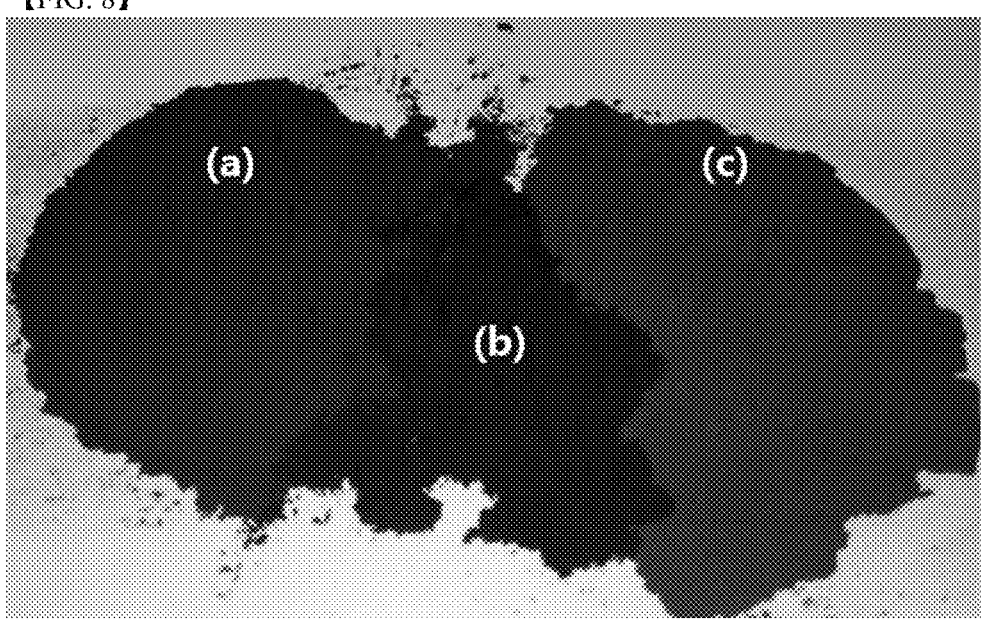

[FIG. 9]
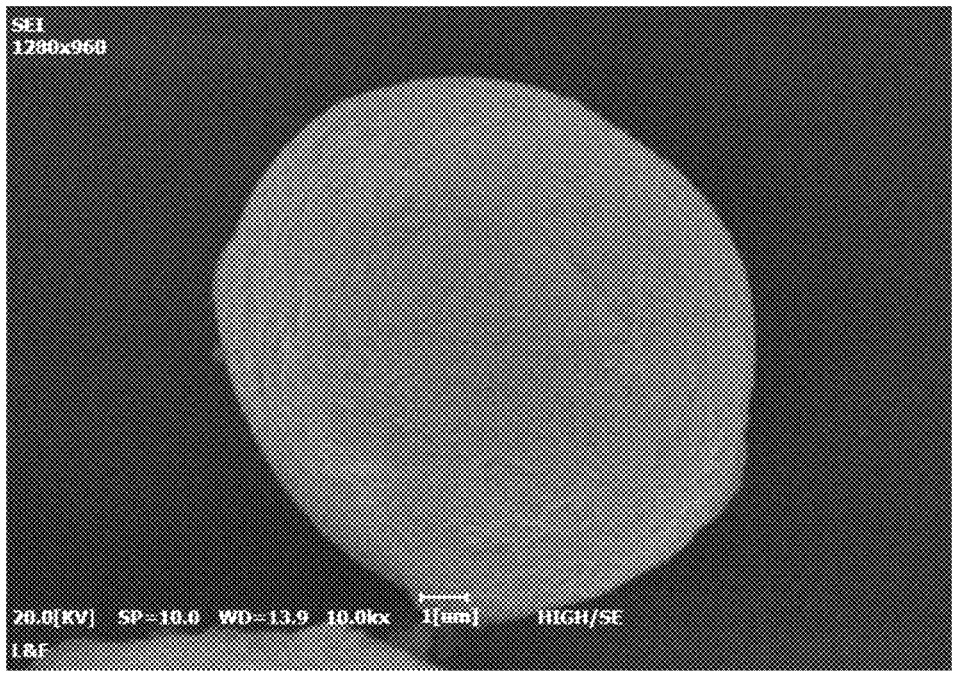
[FIG. 10]
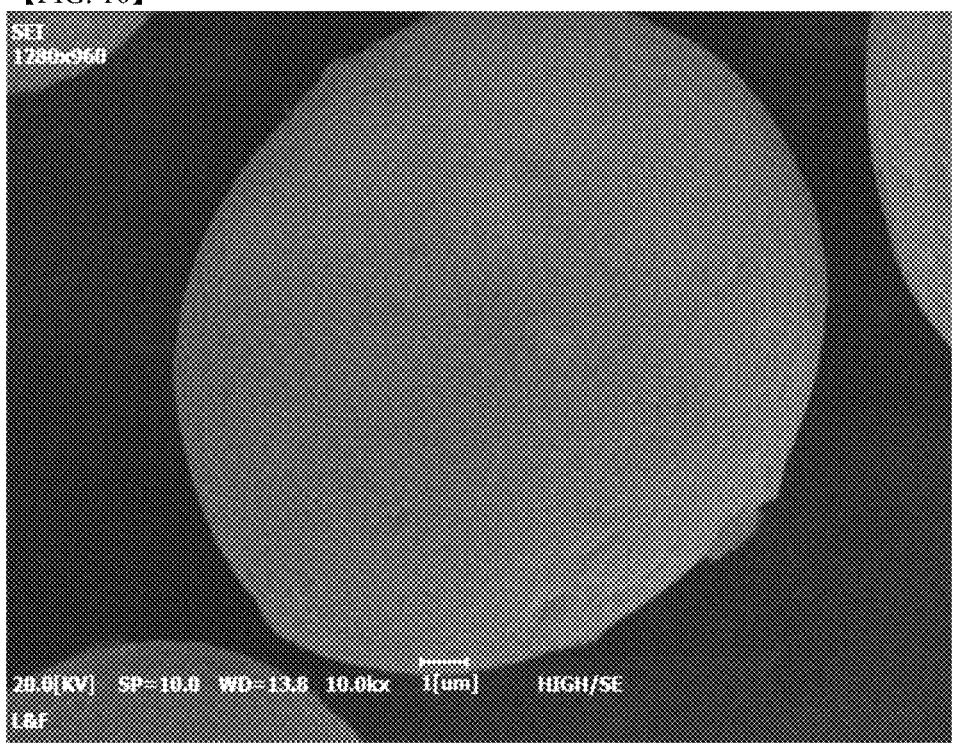

【FIG. 11】
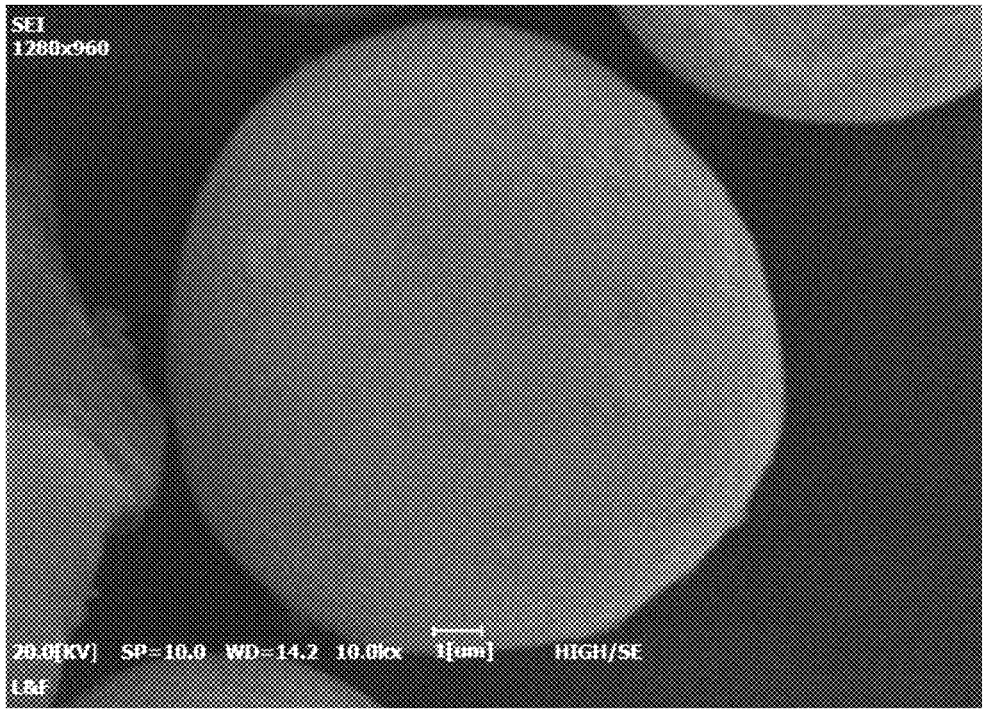
【FIG. 12】
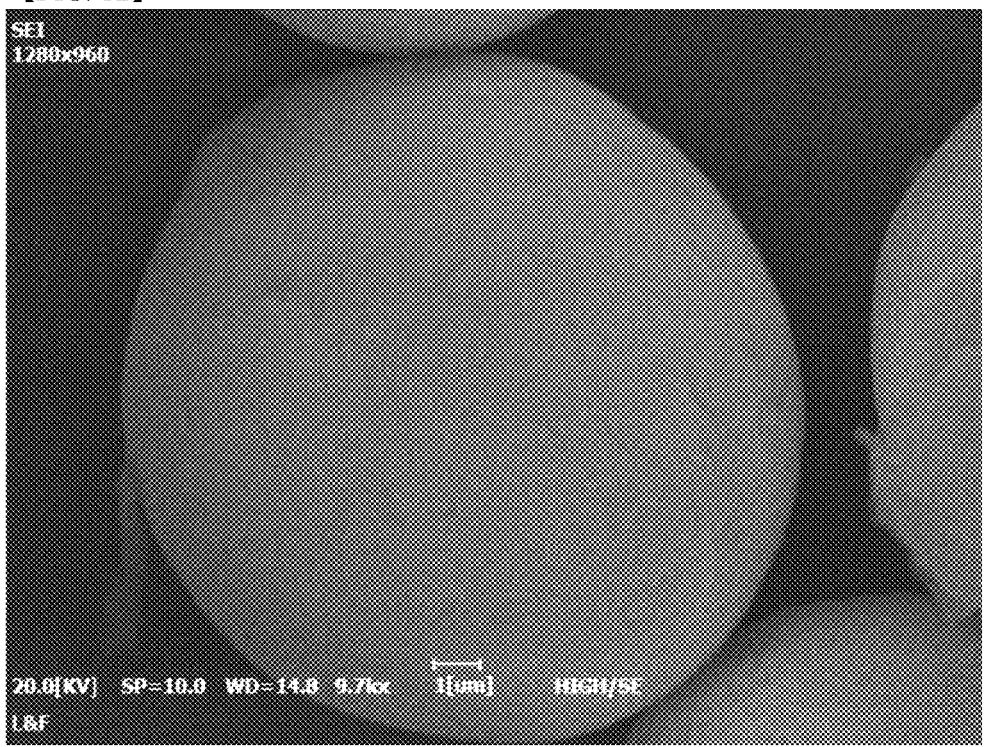

PRECURSOR PARTICLE FOR PREPARATION OF CATHODE ACTIVE MATERIAL FOR SECONDARY BATTERY AND NOVEL PRECURSOR POWDER CONTAINING SAME

TECHNICAL FIELD

The present invention relates to novel precursor particles for preparing a cathode active material for secondary batteries and a novel precursor powder including the same, and more particularly to novel precursor particles for preparing a cathode active material for secondary batteries, including transition metal precursor particles containing one or more transition metals and one or more of an alkali metal and an alkaline earth metal, wherein the alkali metal and alkaline earth metal are contained in one or more of inner and outer parts of the transition metal precursor particles, and a novel precursor powder including the same.

BACKGROUND ART

As the demand for solutions to environmental problems and mobile electronic devices increases, the application of secondary batteries is further expanding to batteries for automobiles, batteries for power storage, batteries for power tools, etc., and moreover, the proportion of the price of a product that is accounted for by a battery is increasing significantly compared to previous mobile phones, laptops, and tablets. Therefore, reducing the cost of the battery plays a very important role in determining success or failure of an enterprise.

A cathode active material, which is a main component of a secondary battery, is one of the most expensive materials used in a secondary battery, and accounts for about 30 to 50% of the material costs thereof.

However, the prior art focused on efforts to reduce costs by changing the composition of secondary battery materials, and attempts to reduce costs of production methods and precursors failed.

That is, there is a limit to the extent to which productivity can be improved and production costs can be reduced using only the conventional technology.

Therefore, there is urgent need for cost reduction by a novel approach.

DISCLOSURE

Technical Problem

Therefore, the present invention has been made to solve the above and other technical problems that have yet to be resolved.

Therefore, as a result of extensive research and various experimentation, the present inventors have developed novel precursor particles that can be used as a main raw material for a cathode active material for a secondary battery and a novel precursor powder including the same.

These novel precursor particles have a configuration in which the alkali metal and/or alkaline earth metal are uniformly distributed in the transition metal precursor particles and thus are capable of remarkably improving productivity owing to very high diffusion rate and thus greatly reduced reaction time upon production of the cathode active material and of enhancing the performance of the secondary battery along with the capacity increase due to high packing density.

Technical Solution

The meaning of the term "precursor" will be described for clear understanding of the present invention.

In general, in the art, all of transition metal, alkali metal, and alkaline earth metal materials used to produce a cathode active material are referred to as "precursors". The alkali metal and alkaline earth metal materials may also be referred to as "raw materials" rather than "precursors".

Each of the transition metal precursor, alkali metal precursor, and alkaline earth metal precursor has both the meaning of "a metal particle" and the meaning of "a powder" containing a plurality of particles, and both the particle and the powder form are broadly referred to as a "precursor" in the art. Hereinafter, the terms "particle" and "powder" are used with this distinction in meaning in order to avoid confusion of terms.

As will be described later, the novel precursor powder according to the present invention is a substance consisting of a large number of novel precursor particles, but is produced in bulk from a large amount of novel precursor particles, rather than producing each precursor particle one by one and then collecting the resulting precursor particles, so the alkali metal and/or alkaline earth metal that are not incorporated into inner and outer parts of novel precursor particles may be present as separate substances in the novel precursor powder, more particularly between the novel precursor particles.

The novel precursor particles used to produce a cathode active material for a secondary battery according to the present invention include transition metal precursor particles, containing one or more transition metals, and one or more of an alkali metal and an alkaline earth metal, wherein the alkali metal and/or alkaline earth metal are contained in one or more of inner and outer parts of the transition metal precursor particles.

The transition metal, alkali metal, and alkaline earth metal are elements defined on the periodic table, and in a specific example, the alkali metal may include at least one of Li (lithium) and Na (sodium).

In a specific example, the novel precursor particles may be in the form of relatively large secondary granules in which fine primary particles are aggregated (the primary particle may also be called a "particle" meaning a single particle, and the secondary particle may also be called a "granule" meaning a grain in which a plurality of primary particles is aggregated).

In this embodiment, although the novel precursor particles having a secondary granular form in which a plurality of primary particles is aggregated have been described, novel precursor particles having a primary particle form may be produced depending on the production methods and conditions. The information and knowledge of the primary particles and the secondary granules are known in the art, and thus a detailed description thereof will be omitted herein.

The primary particles may, for example, have a size ranging from 0.01 μm to 5 μm, and the secondary granules may have a size ranging from 2 μm to 100 μm, which is larger than that of the primary particles. There is no particular limitation as to the size of the primary particle and secondary granules.

In a specific embodiment, the secondary granules in which a plurality of primary particles is aggregated may be spherical, as shown in FIG. 1, which is an SEM image of precursor particles constituting the precursor powder prepared in some embodiments of the present invention. The primary particles may have any of various shapes such as spherical, needle and plate shapes, and the shapes of the primary and secondary granules may vary depending on the production methods and conditions.

The present invention is characterized in that the alkali metal and/or alkaline earth metal are contained in one or more of inner and outer parts of the transition metal precursor particles.

In the prior art, a cathode active material was prepared by separately preparing a transition metal precursor powder and an alkali metal precursor/alkaline earth metal precursor powder, followed by mixing the powders with each other and firing the result. In contrast, the present invention obviates a mixing process, thus maximizing productivity, because the alkali metal and/or alkaline earth metal are contained in the transition metal precursor particles.

Furthermore, in the prior art, alkali metal and/or alkaline earth metal precursor particles are present separately from the transition metal precursor particles, which causes problems of a long movement path of each metal element, a long reaction time, a low probability of contact between the metal elements, and thus low reaction uniformity. However, in the present invention, the transition metal precursor particles contain the alkali metal and/or alkaline earth metal, which confers advantages of a greatly shortened movement path for each metal element, very fast reaction, a very high probability of contact between the metal elements, and high reaction uniformity, resulting in dramatically increased productivity.

The alkali metal and/or alkaline earth metal contained in the transition metal precursor particles may be present in any one of various forms such as atoms, molecular, sol, gel, and powder form, and may include one or more of salts, hydroxides, and oxides.

The presence of alkali metal and/or alkaline earth metal in the novel precursor particles can be identified through elemental analysis. Emission spectroscopy (ICP), a destructive analysis method, may be used as a general method to detect all of the elemental components in the particles. The distribution of elements in the inward direction from the surface of the particles can be mainly identified through X-ray photoelectron spectroscopy (XPS).

In addition, the presence and position of transition metal precursor particles and alkali metals can be identified with images taken by SEM, TEM, or the like. At this time, imaging is preferably performed after general polishing or cross-section cutting through an ion beam in order to identify the inside of novel precursor particles.

The alkali metal and/or alkaline earth metal may be contained in the form of a compound and/or a mixture in the novel precursor particles, and may be present in at least one of the following states:

(a) coating the surface of the primary particles and/or secondary granules;
(b) present in the voids between the primary particles; and
(c) present in the inner part of primary particles and/or secondary granules.

That is, the alkali metal and/or alkaline earth metal may be present in any one of various parts of the novel precursor particles according to the present invention, and may be uniformly distributed, which can be seen from FIG. 2.

FIG. 2 shows the result of EDS analysis of the cross-section of novel precursor particles according to the present invention, wherein the precursor particles are prepared in the same manner as in Example 13, except that a Na compound (NaOH) is used as an alkali metal instead of a Li compound (LiOH), which will be described later.

It can be seen that Na (sodium), which is an alkali metal, is uniformly distributed in inner and outer parts of NCM transition metal precursor particles, and in particular, is present in the form of a coating layer in the outer part thereof.

As can be seen from FIG. 2, the coating layer may be seen in the non-uniform in portions thereof, but this is because Na is contained at a high concentration to provide easy detection through EDS.

The transition metal contained in the novel precursor particles according to the present invention may be present in any one of various hydroxide or oxide forms, such as hydroxides, oxyhydroxides, and hydroxide analogues.

When the transition metal is present in any one of various types of hydroxides, the novel precursor particles of the present invention may have the composition represented by the following Formula 1:

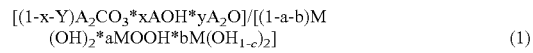

$$[(1-x-Y)A_2CO_3 * xAOH * yA_2O]/[(1-a-b)M(OH)_2 * aMOOH * bM(OH_{1-c})_2] \quad (1)$$

wherein
$0 \leq x \leq 1$, $0 \leq y \leq 1$, $0 \leq a \leq 1$, $0 \leq b \leq 1$, $0 \leq c \leq 1$;
A/M (molar ratio)>0;
A represents at least one alkali metal and/or alkaline earth metal; and
M includes one or more, preferably two or more transition metals that are stable in a tetracoordinate or hexacoordinate structure.

When the transition metal is present as an oxide, the novel precursor particles of the present invention may have a composition of the following Formula 2.

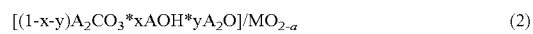

$$[(1-x-y)A_2CO_3 * xAOH * yA_2O]/MO_{2-a} \quad (2)$$

wherein
$0 \leq x \leq 1$, $0 \leq y \leq 1$, $0 \leq a \leq 1$;
A/M (molar ratio)>0;
A represents at least one alkali metal and/or alkaline earth metal; and
M includes one or more, preferably two or more transition metals that are stable in a tetracoordinate or hexacoordinate structure.

A in Formulas 1 and 2 may include one or more of Li and Na.

In addition, M may include two or more selected from elements belonging to Groups 5 (VB) to 11 (VIIIB) on the periodic table, may be selected from Ti, Sc, V, Cr, Mn, Fe, Ni, Co, Y, Cu, Zr, Nb, Mo, Tc, Ru, Rh, Ag, and Pd, and preferably may be selected from Ni, Co and Mn.

Here, A and/or M may further include one or more selected from Group 13 (IIIA) to 15 (IVA) elements. In this case, the further included elements may be selected from Al, Si, P, Sn, In, B, and the like, but are not limited thereto. In some cases, one or more selected from Group 13 (IIIA) to 15 (IVA) elements may be included, instead of alkali metals and alkaline earth metals.

In Formulas 1 and 2, the positions of oxygen or hydrogen may be defective, as is generally known, and the anions may be partially substituted in equivalent valence states with anions such as S, F, $PO_4$, and $SO_4$. In addition, in Formulas 1 and 2, when A is an alkali metal, it may be easily substituted with an alkaline earth metal, as is generally known, and in this case, the molar ratio of the alkaline earth metal to the alkali metal may be 1/2.

A/M (molar ratio), which means the content ratio of the elements, represents the molar ratio (A/M) of the total alkali metal and/or alkaline earth metal (A) to the total transition metal (M). As defined above, A/M is more than 0 and is preferably more than 0 and not more than 1.5 in order to suppress volatilization of alkali metals and/or alkaline earth metals and cation mixing at high temperature. Further, more preferably, A/M is 0.3 to 1.4, even more preferably 0.5 to 1.35.

In addition, the present invention provides a novel precursor powder containing the novel precursor particles described above.

The novel precursor powder according to the present invention may be prepared by various methods. For example, the methods may include a method of adding a compound/mixture containing an alkali metal and/or alkaline earth metal during the process of co-precipitating one or more, preferably two or more, transition metals, a method of adding a compound/mixture containing an alkali metal and/or alkaline earth metal in a base-based washing and filtration process to remove acidic components of the transition metal salt used in the co-precipitation after the co-precipitation process, a method of adding a compound/mixture containing an alkali metal and/or alkaline earth metal in the process of aggregating the primary particles obtained through the co-precipitation into secondary granules, and the like. The co-precipitation process is a method of inducing precipitation by adding a basic material to an acidic solution in which a transition metal salt is dissolved.

As a result, the novel precursor powder may be prepared by any one selected from the above methods, and the novel precursor particles constituting the novel precursor powder have the characteristics as described above.

Accordingly, the present invention provides a novel precursor powder prepared by any one selected from the methods described above.

When the content molar ratio (A/M) of the total alkali metal and/or alkaline earth metal (A) to the total transition metal (M) of the novel precursor particle in the prepared novel precursor powder (novel precursor initial powder) is more than 0 and less than 1, another novel precursor powder (novel precursor final powder) having a molar ratio (A/M) of not less than 1 and not more than 1.5 can be prepared by further mixing the novel precursor powder (novel precursor initial powder) with a compound and/or mixture containing an alkali metal and/or alkaline earth metal, and a cathode active material can be prepared by firing the mixed novel precursor powder (the novel precursor final powder).

When the content molar ratio (A/M) of the total alkali metal and/or alkaline earth metal (A) to the total transition metal (M) of the novel precursor particle is not less than 1 and is not more than 1.5, the cathode active material can be prepared by firing only the novel precursor powder, without separately adding the compound and/or mixture containing an alkali metal and/or alkaline earth metal.

The firing (calcination) applied during the production of the cathode active material is, for example, performed in an oxygen-containing atmosphere in a temperature range of 750 to 1,000° C., more specifically 800 to 940° C., for 10 hours to 30 hours, more specifically 13 hours to 26 hours.

In addition, after preparing the cathode active material using the novel precursor powder according to the present invention, a secondary battery including the cathode active material may be produced.

The configuration and production method of the secondary battery are known in the art, and thus a detailed description thereof will be omitted herein.

Advantageous Effects

As described above, the novel precursor particles for preparing a cathode active material according to the present invention contain a transition metal, as well as an alkali metal and/or an alkaline earth metal, and thus improve capacity and productivity due to high packing density. In addition, the novel precursor particles have a structure in which the alkali metal and/or alkaline earth metal are uniformly distributed in the transition metal precursor particles, and thus can shorten the reaction time due to the high diffusion rate and remarkably improve productivity and the performance of the secondary battery.

BRIEF DESCRIPTION OF DRAWINGS

FIG. 1 is an SEM image of novel precursor particles constituting a novel precursor powder prepared in an embodiment of the present invention;

FIG. 2 shows the result of mapping analysis based on EDS of novel precursor particles constituting the novel precursor powder prepared in the embodiment of the present invention;

FIG. 3 is a cross-sectional SEM image of novel precursor particles prepared in Experimental Example 3 of the present invention;

FIGS. 4 to 7 are spectra and a component assay table illustrating the results of point analysis based on EDS at Point 1, Point 2, and Point 3 in the precursor particles of FIG. 3;

FIG. 8 is an image showing a comparison in contrast between a novel precursor powder containing Li and a transition metal precursor powder in a bare state in Experimental Example 4 of the present invention; and FIGS. 9 to 12 are SEM images showing the surface morphology of the transition metal precursor particles as a function of Li content in Experimental Example 5 of the present invention.

BEST MODE

Now, the present invention will be described in more detail with reference to the following examples. These examples should not be construed as limiting the scope of the present invention.

[Example 1]—Wet

Along with synthesis by co-precipitation at a ratio of Ni:Co:Mn=5:2:3, a Li compound ($Li_2CO_3$) was added in a wet manner using a circulating filtration apparatus such that the molar ratio of Li to metal was adjusted to 1.03, followed by drying in an oven at 120° C. for 12 hours to remove moisture to prepare a novel precursor powder.

The prepared novel precursor powder was fired at 940° C. for 13 hours while air was made to flow to prepare a cathode active material of $LiNi_{0.5}Co_{0.2}Mn_{0.3}O_2$.

[Example 2]—Wet

Along with synthesis by co-precipitation at a ratio of Ni:Co:Mn=5:2:3, a Li compound ($Li_2CO_3$) was added in a wet manner using a circulating filtration apparatus such that the molar ratio of Li to metal was adjusted to 1.03, followed by drying in an oven at 120° C. for 12 hours to remove moisture to prepare a novel precursor powder.

The prepared novel precursor powder was fired at 940° C. for 10 hours while air was made to flow to prepare a cathode active material of $LiNi_{0.5}Co_{0.2}Mn_{0.3}O_2$.

[Example 3]—Wet+Dry

Along with synthesis by co-precipitation at a ratio of Ni:Co:Mn=5:2:3, a Li compound ($Li_2CO_3$) was added in a wet manner using a circulating filtration apparatus such that the molar ratio of Li to metal was adjusted to 0.85, followed by drying in an oven at 120° C. for 12 hours to remove moisture to prepare a novel precursor initial powder.

The dried novel precursor initial powder was charged in a stirrer, and then a Li compound ($Li_2CO_3$) was further added thereto at a molar ratio of Li to metal of 0.18, followed by stirring to prepare a novel precursor final powder as a mixture having a molar ratio of Li to metal of 1.03.

The prepared novel precursor final powder was fired at 940° C. for 15 hours while air was made to flow to prepare a cathode active material of $LiNi_{0.5}Co_{0.2}Mn_{0.3}O_2$.

[Example 4]—Wet+Dry

Along with synthesis by co-precipitation at a ratio of Ni:Co:Mn=5:2:3, a Li compound ($Li_2CO_3$) was added in a wet manner using a circulating filtration apparatus such that the molar ratio of Li to metal was adjusted to 0.5, followed by drying in an oven at 120° C. for 12 hours to remove moisture to prepare a novel precursor initial powder.

The dried novel precursor initial powder was charged in a stirrer, and a Li compound ($Li_2CO_3$) was further added thereto at a molar ratio of Li to the metal of 0.53, followed by stirring to prepare a novel precursor final powder as a mixture having a molar ratio of Li to the metal of 1.03.

The prepared novel precursor final powder was fired at 940° C. for 15 hours while air was made to flow to prepare a cathode active material of $LiNi_{0.5}Co_{0.2}Mn_3O_2$.

[Example 5]—Wet+Dry

Along with synthesis by co-precipitation at a ratio of Ni:Co:Mn=5:2:3, a Li compound ($Li_2CO_3$) was added in a wet manner using a circulating filtration apparatus such that the molar ratio of Li to metal was adjusted to 0.3, followed by drying in an oven at 120° C. for 12 hours to remove moisture to prepare a novel precursor initial powder.

The dried novel precursor initial powder was charged in a stirrer, and a Li compound ($Li_2CO_3$) was further added thereto at a molar ratio of Li to the metal of 0.73, followed by stirring to prepare a novel precursor final powder as a mixture having a molar ratio of Li to the metal of 1.03.

The prepared novel precursor final powder was fired at 940° C. for 15 hours while air was made to flow to prepare a cathode active material of $LiNi_{0.5}Co_{0.2}Mn_{0.3}O_2$.

[Example 6]—Wet+Dry

Along with synthesis by co-precipitation at a ratio of Ni:Co:Mn=5:2:3, a Li compound ($Li_2CO_3$) was added in a wet manner using a circulating filtration apparatus such that the molar ratio of Li to metal was adjusted to 0.1, followed by drying in an oven at 120° C. for 12 hours to remove moisture to prepare a novel precursor initial powder.

The dried novel precursor initial powder was charged in a stirrer, and a Li compound ($Li_2CO_3$) was further added thereto at a molar ratio of Li to the metal of 0.93, followed by stirring to prepare a novel precursor final powder as a mixture having a molar ratio of Li to the metal of 1.03.

The prepared novel precursor final powder was fired at 940° C. for 15 hours while air was made to flow to prepare a cathode active material of $LiNi_{0.5}Co_{0.2}Mn_{0.3}O_2$.

[Comparative Example 1]—Dry

A transition metal precursor was prepared at a ratio of Ni:Co:Mn=5:2:3 and was dried in an oven at 120° C. for 12 hours to remove moisture to prepare a transition metal precursor powder.

The dried transition metal precursor powder was mixed with $Li_2CO_3$ at a molar ratio of Li to the metal of 1.03 in a dry manner to prepare a Li-transition metal mixture precursor powder.

The prepared Li-transition metal mixture precursor powder was fired at 940° C. for 18 hours while air was made to flow to prepare a cathode active material of $LiNi_{0.5}Co_{0.2}Mn_{0.3}O_2$.

[Example 7]—Wet

Along with synthesis by co-precipitation at a ratio of Ni:Co:Mn=6:2:2, a Li compound (LiOH) was added in a wet manner using a circulating filtration apparatus such that the molar ratio of Li to metal was adjusted to 1.03, followed by drying in an oven at 120° C. for 12 hours to remove moisture to prepare a novel precursor powder.

The prepared novel precursor powder was fired at 860° C. for 15 hours while air was made to flow to prepare a cathode active material of $LiNi_{0.6}Co_{0.2}Mn_{0.2}O_2$.

[Example 8]—Wet

Along with synthesis by co-precipitation at a ratio of Ni:Co:Mn=6:2:2, a Li compound (LiOH) was added in a wet manner using a circulating filtration apparatus such that the molar ratio of Li to metal was adjusted to 1.03, followed by drying in an oven at 120° C. for 12 hours to remove moisture to prepare a novel precursor powder.

The prepared novel precursor powder was fired at 860° C. for 12 hours while air was made to flow to prepare a cathode active material of $LiNi_{0.6}Co_{0.2}Mn_{0.2}O_2$.

[Example 9]—Wet+Dry

Along with synthesis by co-precipitation at a ratio of Ni:Co:Mn=6:2:2, a Li compound (LiOH) was added in a wet manner using a circulating filtration apparatus such that the molar ratio of Li to metal was adjusted to 0.85, followed by drying in an oven at 120° C. for 12 hours to remove moisture to prepare a novel precursor initial powder.

The dried novel precursor initial powder was charged in a stirrer, and a Li compound (LiOH) was further added thereto at a molar ratio of Li to the metal of 0.18, followed by stirring to prepare a novel precursor final powder as a mixture having a molar ratio of Li to the metal of 1.03.

The prepared novel precursor final powder was fired at 860° C. for 18 hours while air was made to flow to prepare a cathode active material of $LiNi_{0.6}Co_{0.2}Mn_{0.2}O_2$.

[Example 10]—Wet+Dry

Along with synthesis by co-precipitation at a ratio of Ni:Co:Mn=6:2:2, a Li compound (LiOH) was added in a wet manner using a circulating filtration apparatus such that the molar ratio of Li to metal was adjusted to 0.5, followed by drying in an oven at 120° C. for 12 hours to remove moisture to prepare a novel precursor initial powder.

The dried novel precursor initial powder was charged in a stirrer, and a Li compound (LiOH) was further added thereto at a molar ratio of Li to the metal of 0.53, followed by stirring to prepare a novel precursor final powder as a mixture having a molar ratio of Li to the metal of 1.03.

The prepared novel precursor final powder was fired at 860° C. for 18 hours while air was made to flow to prepare a cathode active material of $LiNi_{0.6}Co_{0.2}Mn_{0.2}O_2$.

[Example 11]—Wet+Dry

Along with synthesis by co-precipitation at a ratio of Ni:Co:Mn=6:2:2, a Li compound (LiOH) was added in a wet manner using a circulating filtration apparatus such that the molar ratio of Li to metal was adjusted to 0.3, followed by drying in an oven at 120° C. for 12 hours to remove moisture to prepare a novel precursor initial powder.

The dried novel precursor initial powder was charged in a stirrer, and a Li compound (LiOH) was further added thereto at a molar ratio of Li to the metal of 0.73, followed by stirring, to prepare a novel precursor final powder as a mixture having a molar ratio of Li to the metal of 1.03.

The prepared novel precursor final powder was fired at 860° C. for 18 hours while air was made to flow to prepare a cathode active material of $LiNi_{0.6}Co_{0.2}Mn_{0.2}O_2$.

[Example 12]—Wet+Dry

Along with synthesis by co-precipitation at a ratio of Ni:Co:Mn=6:2:2, a Li compound (LiOH) was added in a wet manner using a circulating filtration apparatus such that the molar ratio of Li to metal was adjusted to 0.1, followed by drying in an oven at 120° C. for 12 hours to remove moisture to prepare a novel precursor initial powder.

The dried novel precursor initial powder was charged in a stirrer, and a Li compound (LiOH) was further added thereto at a molar ratio of Li to the metal of 0.93, followed by stirring to prepare a novel precursor final powder as a mixture having a molar ratio of Li to the metal of 1.03.

The prepared novel precursor final powder was fired at 860° C. for 18 hours while air was made to flow to prepare a cathode active material of $LiNi_{0.6}Co_{0.2}Mn_{0.2}O_2$.

[Comparative Example 2]—Dry

A transition metal precursor was prepared at a ratio of Ni:Co:Mn=6:2:2 and was dried in an oven at 120° C. for 12 hours to remove moisture to prepare a transition metal precursor powder.

The dried transition metal precursor powder was mixed with LiOH at a molar ratio of Li to the metal of 1.03 in a dry manner, to prepare a Li-transition metal mixture precursor powder.

The prepared Li-transition metal mixture precursor powder was fired at 860° C. for 20 hours while air was made to flow to prepare a cathode active material of $LiNi_{0.6}Co_{0.2}Mn_{0.2}O_2$.

[Example 13]—Wet

Along with synthesis by co-precipitation at a ratio of Ni:Co:Mn=8.2:1.1:0.7, a Li compound (LiOH) was added in a wet manner using a circulating filtration apparatus such that the molar ratio of Li to metal was adjusted to 1.03, followed by drying in an oven at 120° C. for 12 hours to remove moisture to prepare a novel precursor powder.

The prepared novel precursor powder was fired at 800° C. for 20 hours while air was made to flow to prepare a cathode active material of $LiNi_{0.82}Co_{0.11}Mn_{0.07}O_2$.

[Example 14]—Wet

Along with synthesis by co-precipitation at a ratio of Ni:Co:Mn=8.2:1.1:0.7, a Li compound (LiOH) was added in a wet manner using a circulating filtration apparatus such that the molar ratio of Li to metal was adjusted to 1.03, followed by drying in an oven at 120° C. for 12 hours to remove moisture to prepare a novel precursor powder.

The prepared novel precursor powder was fired at 800° C. for 18 hours while air was made to flow to prepare a cathode active material of $LiNi_{0.82}Co_{0.11}Mn_{0.07}O_2$.

[Example 15]—Wet+Dry

Along with synthesis by co-precipitation at a ratio of Ni:Co:Mn=8.2:1.1:0.7, a Li compound (LiOH) was added in a wet manner using a circulating filtration apparatus such that the molar ratio of Li to metal was adjusted to 0.85, followed by drying in an oven at 120° C. for 12 hours to remove moisture to prepare a novel precursor initial powder.

The dried novel precursor initial powder was charged in a stirrer, and a Li compound (LiOH) was further added thereto at a molar ratio of Li to the metal of 0.18, followed by stirring to prepare a novel precursor final powder as a mixture having a molar ratio of Li to the metal of 1.03.

The prepared novel precursor final powder was fired at 800° C. for 24 hours while air was made to flow to prepare a cathode active material of $LiNi_{0.82}Co_{0.11}Mn_{0.07}O_2$.

[Example 16]—Wet+Dry

Along with synthesis by co-precipitation at a ratio of Ni:Co:Mn=8.2:1.1:0.7, a Li compound (LiOH) was added in a wet manner using a circulating filtration apparatus such that the molar ratio of Li to metal was adjusted to 0.5, followed by drying in an oven at 120° C. for 12 hours to remove moisture to prepare a novel precursor initial powder.

The dried novel precursor initial powder was charged in a stirrer, and a Li compound (LiOH) was further added thereto at a molar ratio of Li to the metal of 0.53, followed by stirring to prepare a novel precursor final powder as a mixture having a molar ratio of Li to the metal of 1.03.

The prepared novel precursor final powder was fired at 800° C. for 24 hours while air was made to flow to prepare a cathode active material of $LiNi_{0.82}Co_{0.11}Mn_{0.07}O_2$.

[Example 17]—Wet+Dry

Along with synthesis by co-precipitation at a ratio of Ni:Co:Mn=8.2:1.1:0.7, a Li compound (LiOH) was added in a wet manner using a circulating filtration apparatus such that the molar ratio of Li to metal was adjusted to 0.3, followed by drying in an oven at 120° C. for 12 hours to remove moisture to prepare a novel precursor initial powder.

The dried novel precursor initial powder was charged in a stirrer, and a Li compound (LiOH) was further added thereto at a molar ratio of Li to the metal of 0.73, followed by stirring to prepare a novel precursor final powder as a mixture having a molar ratio of Li to the metal of 1.03.

The prepared novel precursor final powder was fired at 800° C. for 24 hours while air was made to flow to prepare a cathode active material of $LiNi_{0.82}Co_{0.11}Mn_{0.07}O_2$.

[Example 18]—Wet+Dry

Along with synthesis by co-precipitation at a ratio of Ni:Co:Mn=8.2:1.1:0.7, a Li compound (LiOH) was added in a wet manner using a circulating filtration apparatus such that the molar ratio of Li to metal was adjusted to 0.1, followed by drying in an oven at 120° C. for 12 hours to remove moisture to prepare a novel precursor initial powder.

The dried novel precursor initial powder was charged in a stirrer, and a Li compound (LiOH) was further added thereto at a molar ratio of Li to the metal of 0.93, followed by stirring to prepare a novel precursor final powder as a mixture having a molar ratio of Li to the metal of 1.03.

The prepared novel precursor final powder was fired at 800° C. for 24 hours while air was made to flow to prepare a cathode active material of $LiNi_{0.82}Co_{0.11}Mn_{0.07}O_2$.

[Comparative Example 3]—Dry

A transition metal precursor was prepared at a ratio of Ni:Co:Mn=8.2:1.1:0.7 and dried in an oven at 120° C. for 12 hours to remove moisture to prepare a transition metal precursor powder.

The dried transition metal precursor powder was mixed with LiOH at a molar ratio of Li to the metal of 1.03 in a dry manner, to prepare a Li-transition metal mixture precursor powder.

The prepared Li-transition metal mixture precursor powder was fired at 800° C. for 26 hours while air was made to flow to prepare a cathode active material of $LiNi_{0.82}Co_{0.11}Mn_{0.07}O_2$.

[Example 19]—Wet

Along with synthesis by co-precipitation at a ratio of Ni:Co:Mn=6:2:2, a Li compound (LiOH) was added in a wet manner using a circulating filtration apparatus such that the molar ratio of Li to metal was adjusted to 1.21, followed by drying in an oven at 120° C. for 12 hours to remove moisture to prepare a novel precursor powder.

The prepared novel precursor powder was fired at 860° C. for 15 hours while air was made to flow to prepare a cathode active material of $LiNi_{0.6}Co_{0.2}Mn_{0.2}O_2$.

Experimental Example 1

10 g of the novel precursor powder synthesized in each of Examples 1 to 19 and 10 g of the Li-transition metal mixture precursor powder synthesized in each of Comparative Examples 1 to 3 were charged in a measuring device and a pressure was applied thereto to measure a tap density. The result is shown in Table 1 below.

Experimental Example 2

The residual amount of Li was measured by titration from the cathode active materials prepared in Examples 1 to 19 and Comparative Examples 1 to 3, and the results are shown in Table 1 below.

Experimental Example 3

The results of EDS component assay on the novel precursor particles constituting novel precursor powders that had been prepared in the same manner as in Example 18, except that an Al compound ($Al_2(SO_4)_3$) was used instead of the Li compound, are shown in FIGS. 3 and 4 to 7.

These results showed that Al was contained in the transition metal precursor particles even when Al was used instead of an alkali metal. Both the alkali metal and Al may be used.

Experimental Example 4

The contrast was compared between the novel precursor initial powder prepared in Example 10 (a), the transition metal precursor powder in a bare state (b), and the novel precursor powder prepared in Example 7 (c), and the result is shown in FIG. 8.

As can be seen from FIG. 8, the bare-state transition metal precursor powder that does not contain Li (b) was the darkest, and brightness increased as the Li content increased in an ascending order from powder (a) to powder (c).

Experimental Example 5

SEM images comparing surface morphology between transition metal precursor particles in the bare state (a), novel precursor particles based on Example 10 (b), novel precursor particles based on Example 7 (c), and novel precursor particles based on Example 19 (d) are shown in FIGS. 9 to 12.

As can be seen from these images, the surface (FIG. 9) of bare-state transition metal precursor particles not containing Li (a) has many pores and is thus very rough, whereas the surfaces (FIGS. 10 to 12) of particles containing Li (b, c, d) decrease in roughness because Li fills the voids as the Li content increases.

Experimental Example 6

The cathode active material prepared in each of Examples 1 to 19 and Comparative Examples 1 to 3, a conductive agent, and a binder were mixed at a ratio of 95:2:3 (active material:conductive agent:binder), and the resulting mixture was applied onto an Al foil, followed by drying to produce a cathode. Li metal was used as an anode, an electrolyte solution of 1M $LiPF_6$ in EC/DMC (1:1) was added thereto to produce a secondary battery, and then the discharge capacity was measured at a charge/discharge rate of 0.1C.

The results of measurement of Experimental Examples 1 to 19 described above are shown in Table 1 below.

In general, the productivity (yield) increases as the weight per unit volume increases upon a single firing and the firing time decreases. Here, the unit of weight per volume, that is, the density unit, is g/cc, which is measured as a tap density, and the firing time means the total time from the time at which a firing vessel enters a firing furnace to the time at which the firing vessel passed through the firing furnace and was then cooled. Therefore, the production amount may be converted in accordance with the following formulas.

$$\text{Productivity } (\%) = A \times B \times 100$$

$$A = \frac{\text{Actual (measured) tap density (g/cc)}}{\text{Reference tap density (g/cc)}}$$

$$B = 2 - \left(\frac{\text{Actual (measured) firing time}}{\text{Reference firing time}}\right)$$

Based on this, as shown in Table 1 below, the productivity of Examples 1 to 6 was evaluated relative to Comparative Example 1 as 100%, the productivity of Examples 7 to 12 and Example 19 was evaluated relative to Comparative Example 2 as 100%, and the productivity of Examples 13 to 18 was evaluated relative to Comparative Example 3 as 100%.

TABLE 1

| Type | Item | Li/Me (wet) | Li/Me (dry) | Li/Metal ratio (Total) | Tap density (g/cc) | Firing time (hour) | Firing temperature (° C.) | Li byproduct (Li$_2$CO$_3$) | Discharge capacity (mAh/g) | Production amount (Productivity) |
|---|---|---|---|---|---|---|---|---|---|---|
| NCM 523 | Example 1 | 1.03 | 0 | 1.03 | 2.00 | 13 | 940 | 0.108 | 171.3 | 154% |
|  | Example 2 | 1.03 | 0 | 1.03 | 2.00 | 10 | 940 | 0.117 | 170.8 | 175% |
|  | Example 3 | 0.85 | 0.18 | 1.03 | 1.91 | 15 | 940 | 0.115 | 169.7 | 134% |
|  | Example 4 | 0.5 | 0.53 | 1.03 | 1.85 | 15 | 940 | 0.119 | 169.6 | 129% |
|  | Example 5 | 0.3 | 0.73 | 1.03 | 1.77 | 15 | 940 | 0.121 | 169.4 | 124% |
|  | Example 6 | 0.1 | 0.93 | 1.03 | 1.71 | 15 | 940 | 0.124 | 169.3 | 120% |
|  | Comparative Example 1 | 0 | 1.03 | 1.03 | 1.65 | 18 | 940 | 0.128 | 169.2 | 100% |
| NCM 622 | Example 7 | 1.03 | 0 | 1.03 | 1.80 | 15 | 860 | 0.273 | 181.0 | 156% |
|  | Example 8 | 1.03 | 0 | 1.03 | 1.80 | 12 | 860 | 0.275 | 180.8 | 175% |
|  | Example 9 | 0.85 | 0.18 | 1.03 | 1.67 | 18 | 860 | 0.282 | 180.7 | 128% |
|  | Example 10 | 0.5 | 0.53 | 1.03 | 1.63 | 18 | 860 | 0.291 | 180.4 | 125% |
|  | Example 11 | 0.3 | 0.73 | 1.03 | 1.58 | 18 | 860 | 0.298 | 179.9 | 119% |
|  | Example 12 | 0.1 | 0.93 | 1.03 | 1.47 | 18 | 860 | 0.304 | 179.8 | 113% |
|  | Comparative Example 2 | 0 | 1.03 | 1.03 | 1.43 | 20 | 860 | 0.312 | 179.8 | 100% |
| NCM 821107 | Example 13 | 1.03 | 0 | 1.03 | 1.90 | 20 | 800 | 0.785 | 204.9 | 152% |
|  | Example 14 | 1.03 | 0 | 1.03 | 1.90 | 18 | 800 | 0.794 | 204.5 | 162% |
|  | Example 15 | 0.85 | 0.18 | 1.03 | 1.81 | 24 | 800 | 0.816 | 204.0 | 127% |
|  | Example 16 | 0.5 | 0.53 | 1.03 | 1.77 | 24 | 800 | 0.837 | 203.8 | 124% |
|  | Example 17 | 0.3 | 0.73 | 1.03 | 1.69 | 24 | 800 | 0.864 | 203.7 | 118% |
|  | Example 18 | 0.1 | 0.93 | 1.03 | 1.6 | 24 | 800 | 0.920 | 203.3 | 112% |
|  | Comparative Example 3 | 0 | 1.03 | 1.03 | 1.54 | 26 | 800 | 0.970 | 203.2 | 100% |
| NCM 622 | Example 19 | 1.21 | 0 | 1.21 | 1.52 | 15 | 860 | 0.516 | 175.3 | 132% |

As can be seen from Table 1, the novel precursor powders (Examples 1 to 19) according to the present invention exhibited high productivity and improved secondary battery characteristics in various transition metal compositions.

Specifically, the novel precursor powders exhibit a high packing density because lithium is contained in the precursor, and improve the diffusion of lithium into the precursor during firing, thereby shortening the reaction time and thus remarkably increasing productivity.

In addition, the reactivity improvement of lithium reduces the residual amount of lithium, thereby improving the performance of the secondary battery.

Moreover, when the content of lithium with respect to the transition metal in the novel precursor particles constituting the novel precursor powders is 1 or more (Examples 1, 2, 7, 8, 13, 14, 19), firing can be performed immediately without adding a separate lithium compound/mixture, thus omitting a mixing process and significantly improving productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A novel precursor particle for preparing a cathode active material comprising:
    a transition metal precursor particle containing one or more transition metals; and
    one or more of an alkali metal and an alkaline earth metal, wherein the alkali metal and the alkaline earth metal are contained in one or more of inner and outer parts of the transition metal precursor particle,
    wherein the novel precursor particle has a composition represented by the following Formula 1:

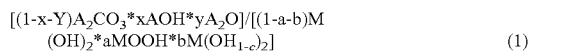
(1)

wherein
    $0 \leq x \leq 1$, $0 \leq y \leq 1$, $0 \leq a \leq 1$, $0 \leq b \leq 1$, $0 \leq c \leq 1$;
    A is at least one alkali metal and/or alkaline earth metal; and
    M comprises one or more transition metals stable in a tetracoordinate or hexacoordinate structure, and
    wherein the molar ratio (A/M) of total alkali metal and/or alkaline earth metal (A) to total transition metal (M) is more than 0 and is not more than 1.5.

2. The novel precursor particle according to claim 1, wherein the alkali metal comprises one or more of Li (lithium) and Na (sodium).

3. The novel precursor particle according to claim 1, wherein the novel precursor particle is a secondary granule formed by aggregation between a plurality of primary particles.

4. The novel precursor particle according to claim 1, the alkali metal or alkaline earth metal is present in at least one of the following states:
    (a) coating the surface of the primary particles and/or secondary granules;
    (b) present in the voids between the primary particles; and
    (c) present in the inner part of primary particles and/or secondary granules.

5. The novel precursor particle according to claim 1, wherein one or more of the alkali metal and the alkaline earth metal are contained in both the inner part and the outer part of the transition metal precursor particle.

6. The novel precursor particle according to claim 1, wherein parameters in the Formula 1 satisfy one of the following combinations (i) to (vii):
    (i) x=0, y=0
    (ii) y=0, x=1
    (iii) x=0, x+y=1
    (iv) y=0, 0<x<1
    (v) x=0, 0<y<1
    (vi) 0<x<1, 0<y<1, x+y=1
    (vii) 0<x<1, 0<y<1, x+y<1.

7. The novel precursor particle according to claim 1, wherein parameters in Formula 1 satisfy one of the following combinations (i) to (vii):
(i) a=0, b=0
(ii) b=0, a=1
(iii) a=0, a+b=1
(iv) b=0, 0<a<1
(v) a=0, 0<b<1
(vi) 0<a<1, 0<b<1, a+b=1
(vii) 0<a<1, 0<b<1, a+b<1.

8. A novel precursor particle for preparing a cathode active material comprising:
a transition metal precursor particle containing one or more transition metals; and
one or more of an alkali metal and an alkaline earth metal, wherein the alkali metal and the alkaline earth metal are contained in one or more of inner and outer parts of the transition metal precursor particle, wherein the novel precursor particle has a composition of the following Formula 2:

$$[(1-x-y)A_2CO_3 * xAOH * yA_2O]/MO_{2-a} \quad (2)$$

wherein
$0 \leq x \leq 1$, $0 \leq y \leq 1$, $0 \leq a \leq 1$;
A is at least one alkali metal and/or alkaline earth metal; and
M comprises one or more transition metals stable in a tetracoordinate or hexacoordinate structure, and
wherein the molar ratio (A/M) of total alkali metal and/or alkaline earth metal (A) to total transition metal (M) is more than 0 and is not more than 1.5.

9. The novel precursor particle according to claim 8, wherein the alkali metal comprises one or more of Li (lithium) and Na (sodium).

10. The novel precursor particle according to claim 8, wherein the novel precursor particle is a secondary granule formed by aggregation between a plurality of primary particles.

11. The novel precursor particle according to claim 8, wherein the alkali metal or alkaline earth metal is present in at least one of the following states:
(a) coating the surface of the primary particles and/or secondary granules;
(b) present in the voids between the primary particles; and
(c) present in the inner part of primary particles and/or secondary granules.

12. The novel precursor particle according to claim 8, wherein one or more of the alkali metal and the alkaline earth metal are contained in both the inner part and the outer part of the transition metal precursor particle.

13. The novel precursor particle according to claim 8, wherein parameters in the Formula 2 satisfy one of the following combinations (i) to (vii):
(i) x=0, y=0
(ii) y=0, x=1
(iii) x=0, x+y=1
(iv) y=0, 0<y<1
(v) x=0, 0<y<1
(vi) 0 <x<1, 0<y<1, x+y=1
(vii) 0<x<1, 0<y<1, x+y<1.

14. A cathode active material prepared by firing the novel precursor powder according to claim 1.

15. A secondary battery comprising the cathode active material according to claim 14.

* * * * *